United States Patent [19]

Garnier et al.

[11] 3,855,625

[45] Dec. 17, 1974

[54] MAGNETIC HEAD SLIDER ASSEMBLY

[75] Inventors: Michael F. Garnier; Tung-Men Tang, both of San Jose; James W. White, Los Gatos, all of Calif.

[73] Assignee: International Business Machines Corporation, Armonk, N.Y.

[22] Filed: Dec. 19, 1973

[21] Appl. No.: 426,382

[52] U.S. Cl. .................. 360/103, 360/122, 360/130

[51] Int. Cl. .......................... G11b 5/60, G11b 21/20

[58] Field of Search ................ 360/102, 103, 97–99, 360/129–130, 122; 308/DIG. 1

[56] References Cited

UNITED STATES PATENTS

| | | | |
|---|---|---|---|
| 3,129,297 | 4/1964 | Schlichting | 360/103 |
| 3,310,792 | 3/1967 | Groom et al. | 360/103 |
| 3,430,006 | 2/1969 | Taylor et al. | 360/103 |
| 3,488,648 | 1/1970 | Church | 360/103 |
| 3,528,067 | 9/1970 | Linsley et al. | 360/103 |
| 3,754,104 | 8/1973 | Piper et al. | 360/103 |
| 3,823,416 | 7/1974 | Warner | 360/122 |

*Primary Examiner*—Alfred H. Eddleman

[57] ABSTRACT

A slider support for a magnetic head assembly is formed with taper flat or step flat outer rails to provide a positive pressure region, and with a recessed portion delineated by an inverse step cross rail between the outer rails and disposed toward the leading edge of the slider element to provide a negative pressure region. The configuration has closed sides and provides a low load and high stiffness self acting air bearing at the slider surface facing a moving magnetic recording medium.

12 Claims, 11 Drawing Figures

MAGNETIC HEAD SLIDER ASSEMBLY

CROSS REFERENCE TO RELATED APPLICATIONS

U.S. Patent application Ser. No. 337,032 filed Mar. 1, 1973, now U.S. Pat. No. 3,823,416, in behalf of M. W. Warner and assigned to the same assignee, describes a magnetic head slider assembly formed with parallel rails for generating an air bearing to maintain the head gap at a substantially constant distance from the recording surface.

BACKGROUND OF THE INVENTION

1. Field of the Invention

This invention relates to a magnetic head slider assembly, and in particular, to a low load flying head assembly.

2. Description of the Prior Art

Magnetic head assemblies that fly relative to magnetic media have been used extensively. The objectives for improving the noncontact transducing relationship between a magnetic transducer and a magnetic recording medium, such as a rotary disk, are to attain very close spacing between the transducer and the disk, and to maintain a stable constant spacing. The close spacing, when used with very narrow transducing gaps and very thin magnetic record films, allows short wave length, high frequency signals to be recorded, thereby affording high density, high storage capacity recording. Additionally, by having a constant spacing between the head and the disk, the amplitude of the signal being recorded or read out is not modified significantly, thus improving signal resolution and making data processing more reliable.

In accessing type disk drives, for example, the flying height of the magnetic head assembly varies as the head is moved radially to different data tracks because the linear speed of the rotating disk at the outer tracks is greater than that at the inner tracks. To compensate for these variations in flying height, different magnitudes of write current must be used for different radial zones to obtain a substantially constant signal amplitude of the recorded data. A constant head to disk spacing reduces the requirements for such compensation, particularly when the head assembly employs a magnetoresistive sensing element.

SUMMARY OF THE INVENTION

An object of this invention is to provide a novel and improved slider support for a flying magnetic head assembly that maintains a substantially constant spacing relative to a moving magnetic medium during transducing operation.

Another object of this invention is to provide a virtually self-loading magnetic head slider assembly.

Another object is to provide a head slider assembly having a high degree of bearing stiffness while employing a low load.

A further object is to provide a head slider assembly that is easy to manufacture and realizes a reduction in cost.

According to a preferred embodiment of this invention, a slider element for a magnetic head assembly is formed with two outer taper flat or step flat rails and a stepped cross rail. The outer rails create positive pressure regions when air flows across their surfaces. The outer rails close the sides of the slider and together with the cross rail delineate a recessed negative pressure region. The positive and negative pressure regions act in a counterbalancing manner that results in a substantially constant load across the total face of the slider. Any changes in the air flow or disk speed do not appreciably affect the net load force, so that the slider assembly and the magnetic transducer effectively maintain the same flying height relative to the disk during the transducing operation.

BRIEF DESCRIPTION OF THE DRAWING

The invention will be described in greater detail with reference to the drawing in which.

Figure 1:
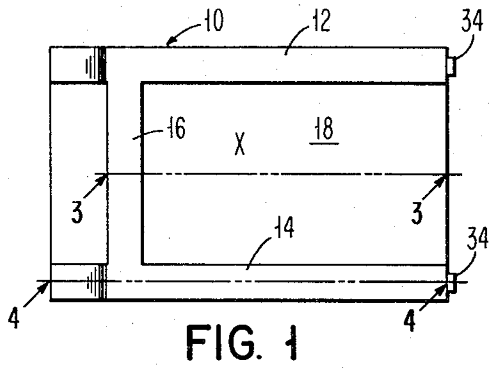
FIG. 1 is a bottom plan view of a magnetic head slider assembly, made in accordance with this invention.
Figure 2A:
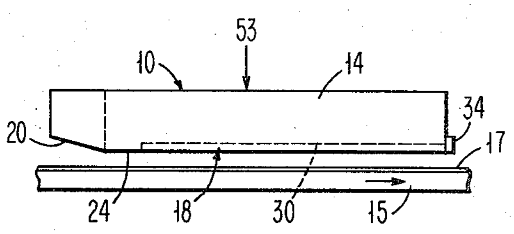
Figure 2B:
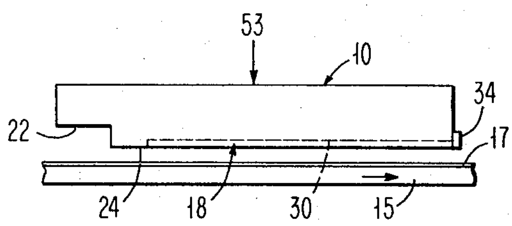
Figure 2C:
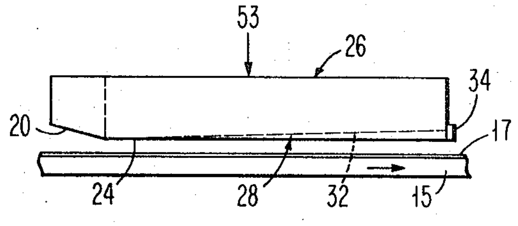
Figures 3A, 3B, 4A, 4B:
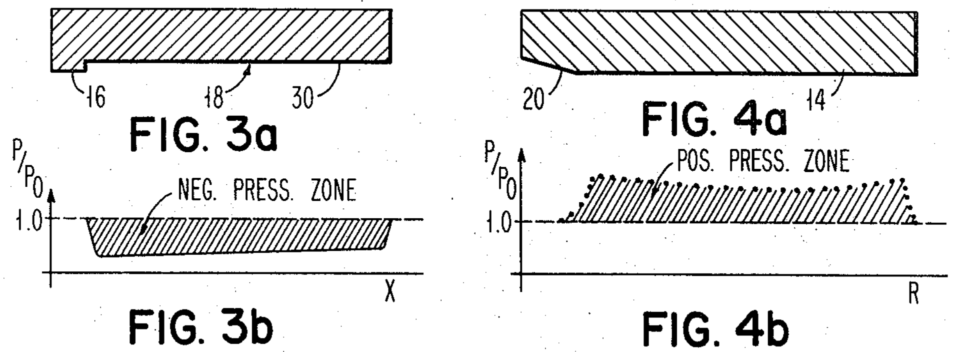

FIG. *2a* is a side view of one embodiment of the invention, using a taper flat design;

FIG. *2b* is another embodiment of the invention, using a step flat design;

FIG. *2c* is another embodiment of the invention, using a taper flat design as in FIG. 1, with a taper recess toward the trailing edge of the slider;

FIG. *3a* is a side sectional view taken along the center line 3—3 of FIG. 1;

FIG. *3b* is a plot of pressure across the length of the section shown in FIG. *3a;*

FIG. *4a* is a side sectional view taken along line 4—4 of FIG. 1;

FIG. *4b* is a plot of pressure along the section shown in FIG. *4a;*

Figure 5:
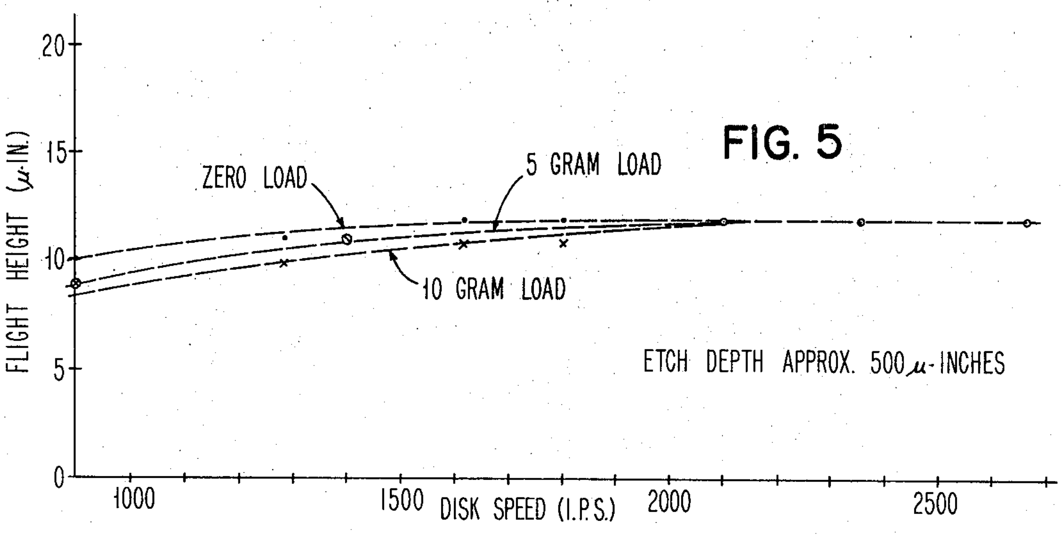
Figure 6A:
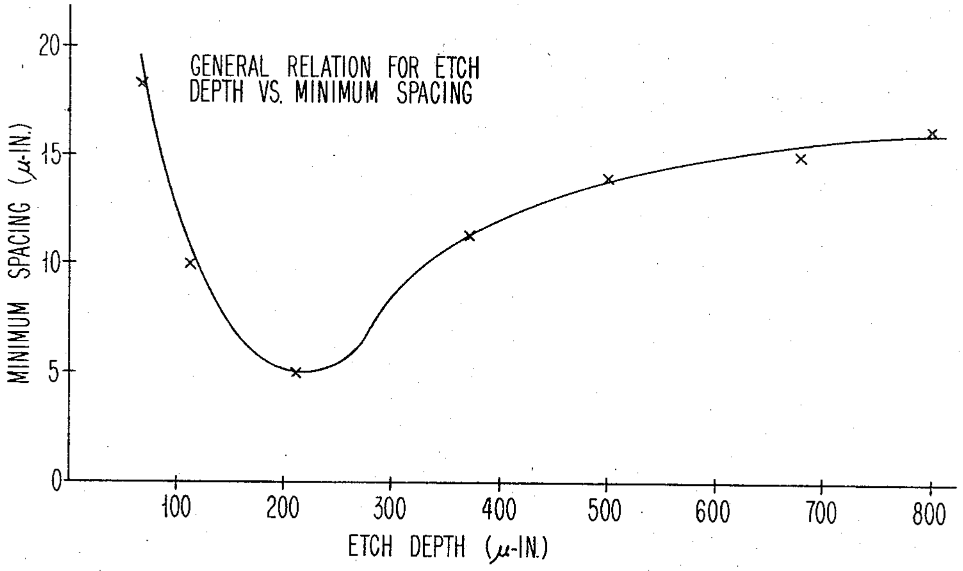
Figure 6B:
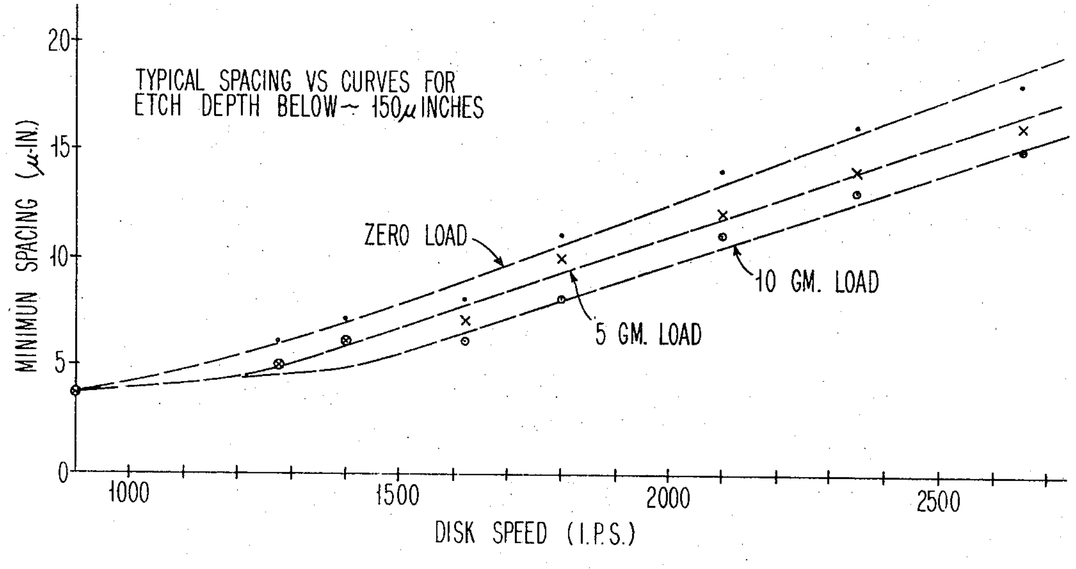

FIG. 5 is a series of curves, plotting flying height of the slider assembly of this invention against variations in disk speed, each curve representing a different load force on the slider assembly; and FIG. *6a* and FIG. *6b* are typical flying characteristics of the slider assembly of this invention.

Similar reference numerals refer to similar elements throughout the drawing.

DESCRIPTION OF THE PREFERRED EMBODIMENT

With reference to FIGS. 1 and *2a–c*, a slider assembly 10 made in accordance with this invention is formed with two side rails 12 and 14 and a cross rail 16 joining the two side rails. The leading edge of the cross rail 16 is formed with a sharp rectangular corner and does not have a corner break or rounded edge. The three rails 12, 14, 16 delineate a rectangular recessed section 18, as depicted in FIGS. *2a* and *2b*, or a tapered recessed section 28, as illustrated in FIG. *2c*.

The leading edge of each rail 12 or 14 may be formed as a taper section 20, illustrated in FIG. *2a* and FIG. *2c*, or as a step section 22, illustrated in FIG. *2b*. These configurations are designated in the art as taper flat and step flat, respectively.

Magnetic transducer elements 34 are bonded to the ends of the rails 12 and 14 with transducing gaps flush with the rail surface. The slider assembly, when it is urged by a load means 53 toward the surface of a magnetic recording medium 17 bonded to a rigid moving substrate 15, establishes a thin air lubricating film which separates the transducers' gaps from the recording medium by a small but constant distance as shown in FIGS. *2a–c*.

With each of the configurations shown in the Figures, positive and negative pressure zones are formed to provide opposing load forces on the slider assembly that are virtually counterbalanced. The positive pressure zones occur along the surfaces of the side rails 12 and 14, whereas the negative pressure zone occurs in the recessed region 18 or 28 following the cross rail 16. It should be noted that the position of the lateral rail 16 establishes the center of the negative pressure region that follows the rail.

The positive pressure zones surround the negative pressure zone thereby providing stability of the magnetic head slider assembly when it is flying during the transducing operation. The distribution of pressure along the centerline X of the negative pressure region 18 is shown in FIG. *3b*, where pressure is measured by P relative to atmospheric pressure Po. The highest negative pressure appears behind the cross rail 16 (FIG. *3a*) and approaches atmospheric pressure towards the trailing edge of the recess 18. FIGS. *4a* and *4b* illustrate the distribution of positive pressure along the surfaces of the rails 12 and 14. The vertical stiffness of the rails is substantially high, thereby requiring a significant change in load force to cause a change in vertical position, i.e., flying height. This feature prevents the tendency for the slider assembly to roll about the longitudinal axis. In addition, the taper leading edge 20, provides a convergence channel, and protects the slider 10 and recording medium from damage, if the slider pitches forward towards the rotating disk.

In operation, the flying height does not change significantly, even if disk speed is varied over a wide range, as illustrated in FIG. 5. Furthermore, the flying height stays within a confined range, even if the loading force on the slider assembly differs. FIG. 5 illustrates the minute changes in slider/flying height over disk speeds from less than a thousand inches per second to greater than 2,500 inches per second for zero load, 5 gram load and 10 gram load forces, respectively. The flying height is maintained substantially in the range of 10 microinches even though the disk speed and slider load are varied. This condition of stability is maintained because any changes in the positive load at the positive pressure regions are counterbalanced by corresponding changes in the load in the negative pressure region.

With the head slider assembly of this invention, the head flies very closely to the magnetic medium, in the order of 5 to 10 microinches. In such case, the system is operating at much less than the boundary layer thickness. The boundary layer is defined as a region of retarded fluid near the surface of a body which moves through a fluid, or past which a fluid moves. The pressures and velocities in this type of operation are different than the mainstream of fluid flow which are found at much greater flying heights.

One of the features of this invention is the self-loading or minimal load ability, which precludes the need for large head loads, such as employed in the prior art. For example, in previously known disk drives, 350 grams force was needed to load the heads. With the head slider configuration disclosed herein, the loading force approaches zero and stability of the flying head is maximized.

Another significant feature of this invention is the high degree of bearing stiffness that is achieved, such that changes in air flow due to variations in disk speed and changes in load do not significantly affect flying height. The positive loads seen along the side rails 14, 16 control the bearing stiffness of the system.

The slider assembly may be made as one continuous integral piece from a ceramic, which is processed by surface etching, such as chemical etching, sputter etching, or ion bombardment. The etching process makes manufacturing easier, particularly for the step flat slider, since taper lapping or grinding is not needed. The surface of the slider is polished to a flatness of less than 1 microinch surface finish. With larger etched depths, 800 microinches, by way of example, there is less negative pressure and therefore a greater flying height and lower bearing stiffness. With smaller etched depths, for example, 200 microinches, the negative pressure increases, flying height is reduced, and bearing stiffness is increased. Further reductions in etch depth lead to a reversal of this trend, i.e., to variations in the negative-positive pressure differential and to a departure from the constant spacing vs. disk speed phenomenon seen for the larger etch depth range. (FIGS. *6a–b*.)

In a system using such a slider assembly, the slider may be initially in contact with the magnetic disk prior to rotation. When the disk beings to rotate, the slider assembly is lifted to close flying height, which is then maintained in a stable condition.

A transducer element 34 is joined to either of or both rails 12 and 14 at the trailing end, so that the transducing gap is flush with the surface of rail 12 or 14 of the slider (FIGS. *2a*, *2b* or *2c*). The transducer 34 may be of the inductive or magnetoresistive type, for example. When more than one transducer 34 is used, the spacing between the rails 12 and 14, and thus the transducers and their sensing gaps may be established to be at some multiple of the desired spacing between recorded data tracks.

In one specific embodiment, a slider assembly approximately 0.160 inch long by 0.120 inch wide was used, with about 0.020 inch wide rails and approximately a 500 microinches etched recess depth. A stable flying height of 9 to 11 microinches was realized. With a 200 microinch recess, a flying height of about 5 microinches was obtained.

It should be understood that the invention is not limited to the specific dimensions, geometries, and parameters set forth above, but these may be modified within the scope of the invention.

What is claimed is:

1. A slider assembly for supporting a transducer in relation to a moving record medium comprising:

a support structure having leading and trailing edges relative to the motion of said medium and a longitudinal axis disposed along the path of said motion;

side rails disposed along the side edges of a surface of said support structure;

a cross rail disposed laterally across the surface of said structure joining said side rails;

said rails defining a recessed section trailing said cross rail, said recessed section being closed on three sides by said rails;

so that a negative pressure region is established at such recessed section, while positive pressure regions are established at said side rails, whereby said surface of said support structure flies very closely to the moving record medium at a substantially constant height.

2. A slider assembly as in claim 1, wherein said side rails are parallel to said longitudinal axis.

3. A slider assembly as in claim 1, wherein the positive pressure and negative pressure regions provide a net load of substantially zero across the surface of said support structure.

4. A slider assembly as in claim 1, wherein said support structure is rectangular.

5. A slider assembly as in claim 1, wherein said side rails are coextensive with the length of said support structure.

6. A slider assembly as in claim 1, wherein said leading portions of the side rails provide a convergent channel.

7. A slider assembly as in claim 1, wherein said leading portions of the side rails are tapered.

8. A slider assembly as in claim 1, wherein the leading portions of said side rails are stepped.

9. A slider assembly as in claim 1, wherein said recessed section has a reversed step geometry.

10. A slider assembly as in claim 1, wherein said recessed portion has a tapered sloping geometry.

11. A slider assembly as in claim 1, wherein said recessed section is recessed to a depth in the range of 50 to 1,200 microinches.

12. A slider assembly as in claim 1, including transducer means mounted at the trailing edge of said slider assembly.

* * * * *